(12) United States Patent
Tebbe et al.

(10) Patent No.: US 11,940,020 B2
(45) Date of Patent: Mar. 26, 2024

(54) RUBBER OUTBOARD DEFLECTOR RING

(71) Applicant: Steering Solutions IP Holding Corporation, Saginaw, MI (US)

(72) Inventors: Adam J. Tebbe, Saginaw, MI (US); Ray A. Baker, Saginaw, MI (US); Scott T. Phillpotts, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 268 days.

(21) Appl. No.: 17/326,305

(22) Filed: May 20, 2021

(65) Prior Publication Data

US 2022/0178403 A1  Jun. 9, 2022

Related U.S. Application Data

(60) Provisional application No. 63/122,172, filed on Dec. 7, 2020.

(51) Int. Cl.
| | |
|---|---|
| *F15D 1/10* | (2006.01) |
| *F16D 3/224* | (2011.01) |
| *F16D 3/84* | (2006.01) |
| *F16D 3/223* | (2011.01) |

(52) U.S. Cl.
CPC ............. *F16D 3/224* (2013.01); *F15D 1/10* (2013.01); *F16D 3/845* (2013.01); *F16D 2003/22326* (2013.01); *Y10S 464/906* (2013.01)

(58) Field of Classification Search
CPC ........................................................ F15D 1/10
USPC ............................................. 16/109; 277/910
See application file for complete search history.

(56) References Cited

U.S. PATENT DOCUMENTS 4,088,328 A * 5/1978 Roeder .................... F16J 15/32
277/910
4,324,114 A * 4/1982 Durham ................... F16J 15/52
277/910

* cited by examiner

*Primary Examiner* — Greg Binda
(74) *Attorney, Agent, or Firm* — Dickinson Wright PLLC

(57) ABSTRACT

A constant velocity joint assembly includes a housing body having an outer surface and an inner surface extending between a first housing end and a second housing end along a central axis. The inner surface of the housing body defines a raceway. A plurality of rollers are disposed in the raceway. A flexible boot is operably fixed to the housing body, with the flexible boot extending along the central axis. A deflector ring is fixed to the outer surface of the housing body. The deflector ring has a metal inner ring portion and a non-metal outer ring portion.

4 Claims, 3 Drawing Sheets

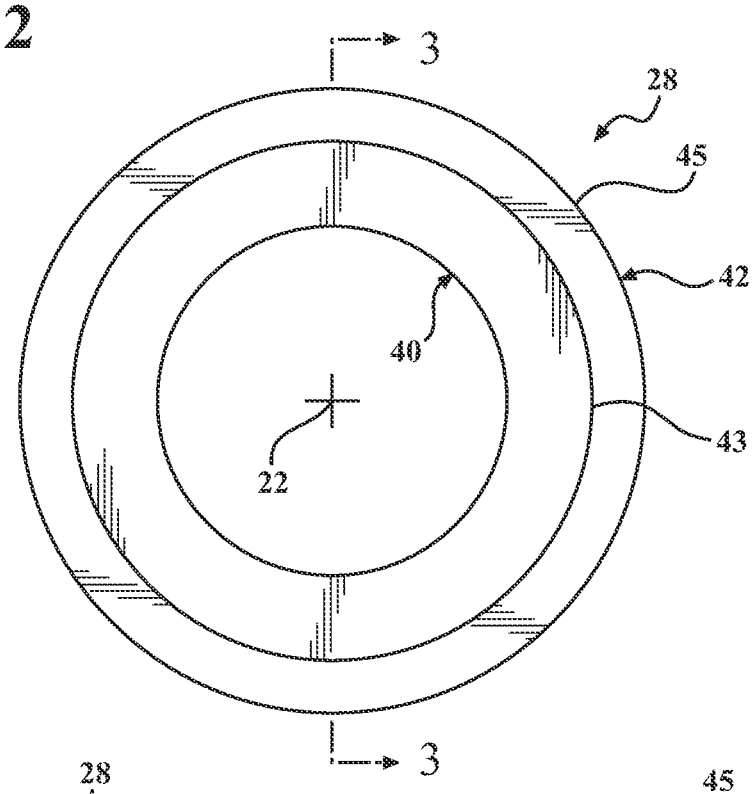
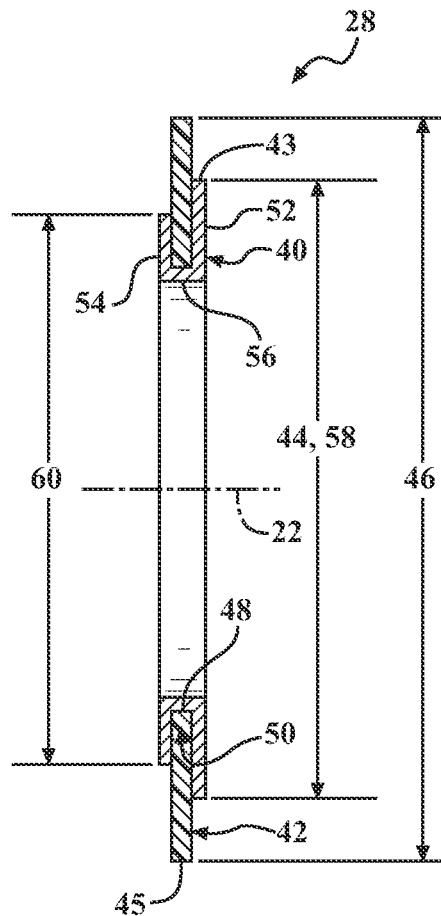
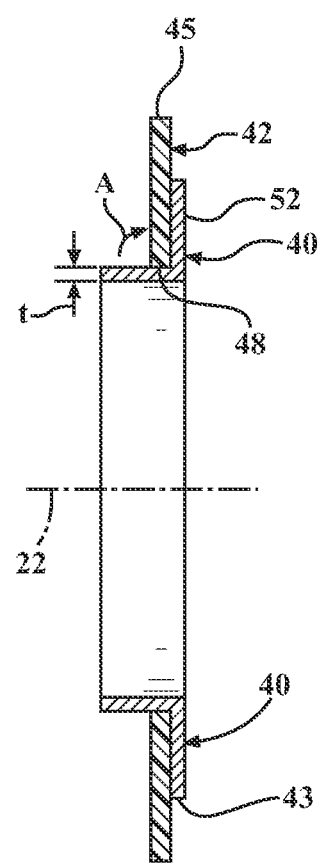
FIG. 2
FIG. 3
FIG. 3A

RUBBER OUTBOARD DEFLECTOR RING

CROSS-REFERENCE TO RELATED APPLICATIONS

This application claims the benefit of U.S. Provisional Application Ser. No. 63/122,172, filed Dec. 7, 2020, which is incorporated herein by reference in its entirety.

BACKGROUND OF THE INVENTION

Constant velocity joints (CV joints) interconnect rotary shaft members of a vehicle. The CV joint includes a CV joint housing having an inner surface for guiding a plurality of rollers. CV joints are commonly used on automobile drive axles and are enclosed with a rubber sealing boot. The rubber sealing boot is designed to retain grease within the CV joint and to prevent outside elements from entering the CV joint. Deflector rings, also referred to as slingers, are commonly disposed on an outer race surface of the CV joint housing to inhibit water and debris from impacting and damaging the mating wheel bearing.

Current deflector rings are made as a monolithic piece of metal material. Although useful to perform their function of deflecting water and debris, they have drawbacks. For example, with the deflector rings being made entirely of metal, an outer periphery of the deflector ring presents a relatively sharp, rigid edge. This edge, when brought into contact with rubber sealing boots of other CV joints, such as during storage, shipping, handling, or otherwise, can cause inadvertent damage to the sealing boot brought into contact with the edge, thereby compromising the functionality of the sealing boot. The edges, if brought into contact with other components, can likewise cause damage to the components and/or the edges can become damaged themselves, such as by being plastically deformed (permanently bent). If bent, the functionality of the deflector ring becomes compromised, thereby exposing the wheel bearing, intended to be protected by the deflector ring, to unwanted exposure to water and debris.

SUMMARY OF THE INVENTION

It is an object of the present disclosure to provide a constant velocity (CV) joint that overcomes at least some of the drawbacks discussed above with known CV joints.

It is a further object of the present disclosure to provide a CV joint housing having a deflector ring that overcomes at least some of the drawbacks discussed above with known CV joint housings.

It is a further object of the present disclosure to provide a deflector ring for a CV joint housing that overcomes at least some of the drawbacks discussed above with known deflector rings.

According to an embodiment of the present disclosure, a CV joint assembly is provided. The CV joint assembly includes a housing body having an outer surface and an inner surface extending between a first housing end and a second housing end along a central axis. The inner surface of the housing body defines a raceway. A plurality of rollers are disposed in the raceway. A flexible boot is operably fixed to the housing body, with the flexible boot extending about the central axis. A deflector ring is fixed to the outer surface of the housing body. The deflector ring has a rigid inner ring portion and a flexible, resilient outer ring portion, wherein the rigid inner ring portion and the flexible, resilient outer ring portion are formed of dissimilar materials.

In accordance with another aspect of the disclosure, the flexible outer ring portion is non-metal material and the rigid inner ring portion is a metal-based material.

In accordance with another aspect of the disclosure, the flexible outer ring portion is polymeric material and the rigid inner ring portion is a metal material.

In accordance with another aspect of the disclosure, the rigid inner ring portion has a maximum outermost first dimension relative to the central axis and the rigid outer ring portion has a maximum outermost second dimension relative to the central axis, the second dimension being greater than the first dimension.

In accordance with another aspect of the disclosure, the rigid inner ring portion has a maximum outermost first diameter and the flexible, resilient outer ring portion has a maximum outermost second diameter, the second diameter being greater than the first diameter.

In accordance with another aspect of the disclosure, the flexible boot can be provided having a first durometer and the flexible, resilient outer ring portion can be provided having a second durometer, wherein the first durometer and the second durometer can be provided being within about 10 percent of one another.

In accordance with another aspect of the disclosure, the first durometer of the flexible boot and the second durometer of the flexible, resilient outer ring portion can be provided being within about 5 percent of one another.

In accordance with another aspect of the disclosure, the flexible boot can be provided having a durometer between about 50-80.

In accordance with another aspect of the disclosure, the first durometer of the flexible boot and the second durometer of the flexible, resilient outer ring portion can be provided being the same.

In accordance with another aspect of the disclosure, the flexible, resilient outer ring portion has an inner periphery and the rigid inner ring portion has a recessed channel, wherein at least a portion of the inner periphery is disposed in the recessed channel.

In accordance with another aspect of the disclosure, the recessed channel in the rigid inner ring is circumferentially continuous and the entirety of the inner periphery of the flexible, resilient outer ring portion is disposed in the recessed channel.

In accordance with another aspect of the disclosure, the recessed channel is bounded by a first lip spaced axially from a second lip along the central axis, with the first lip having an outermost first dimension and the second lip having an outermost second dimension, wherein the first dimension is greater than the second dimension.

In accordance with another aspect of the disclosure, the outer surface of the housing body has a generally cylindrical portion with a shoulder extending radially outwardly from the generally cylindrical portion, and wherein the recessed channel is bounded by a first lip spaced axially from a second lip along the central axis by a cylindrical portion, with the first lip abutting the shoulder.

In accordance with another aspect of the disclosure, the recessed channel is bounded by a first lip spaced axially from a second lip along the central axis by a cylindrical portion, with the first lip, the cylindrical portion, and the second lip having a constant thickness.

In accordance with another aspect of the disclosure, the outer surface of the housing body has a maximum housing outermost dimension, wherein the rigid inner ring portion has a maximum inner ring outermost dimension, and wherein the flexible, resilient outer ring portion has a maximum outer ring outermost dimension, with the maximum inner ring outermost dimension being less than the maximum housing outermost dimension, and with the maximum outer ring outermost dimension being greater than the maximum housing outermost dimension.

In accordance with another aspect of the disclosure, the rigid inner ring portion can be overmolded with material of the flexible, resilient outer ring portion.

In accordance with another aspect of the disclosure, the rigid inner ring portion can be entirely encapsulated by material of the flexible, resilient outer ring portion.

In accordance with another aspect of the disclosure, the flexible, resilient outer ring portion can be provided having a generally L-shaped leg forming an annular inner periphery of the flexible, resilient outer ring portion.

In accordance with another aspect of the disclosure, the rigid inner ring portion can be provided having a generally L-shaped leg forming an annular inner periphery of the rigid inner ring portion.

In accordance with another aspect of the disclosure, the generally L-shaped leg of the rigid inner ring portion can follow the contour of the generally L-shaped leg of the flexible, resilient outer ring portion.

In accordance with another aspect of the disclosure, the generally L-shaped leg of the rigid inner ring portion can be overmolded by material of the generally L-shaped leg of the flexible, resilient outer ring portion.

In accordance with another aspect of the disclosure, a constant velocity joint housing is provided. The constant velocity joint housing includes a housing body having an outer surface and an inner surface extending between a first housing end and a second housing end along a central axis, with the inner surface of the housing body defining a raceway. A flexible boot is operably fixed to the housing body, with the flexible boot extending about the central axis. A deflector ring is fixed to the outer surface of the housing body, with the deflector ring having a rigid inner ring portion and a flexible, resilient outer ring portion, wherein the rigid inner ring portion and the flexible, resilient outer ring portion are formed of dissimilar materials.

In accordance with another aspect of the disclosure, a deflector ring for a constant velocity joint is provided. The deflector ring includes a rigid inner ring portion, and a flexible, resilient outer ring portion fixed to the rigid inner ring portion. The flexible, resilient outer ring portion extends radially outwardly from the rigid inner portion, wherein the rigid inner ring portion and the flexible, resilient outer ring portion are dissimilar materials.

In accordance with another aspect of the disclosure, the rigid inner ring portion of the deflector ring is overmolded with material of the flexible, resilient outer ring portion.

In accordance with another aspect of the disclosure, a method of manufacturing a constant velocity joint housing is provided. The method includes providing a housing body having an outer surface and an inner surface extending between a first housing end and a second housing end along a central axis. Further, fixing a flexible boot to the housing body. Further yet, fixing a deflector ring having a rigid inner ring portion and a flexible, resilient outer ring portion to the outer surface of the housing body, wherein the rigid inner ring portion and the flexible, resilient outer ring portion are formed of dissimilar materials.

In accordance with another aspect of the disclosure, the method further includes providing the flexible, resilient outer ring portion as a non-metal material and providing the rigid inner ring portion as a metal-based material.

In accordance with another aspect of the disclosure, the method further includes providing the flexible, resilient outer ring portion as a polymeric material and providing the rigid inner ring portion as a metal material.

In accordance with another aspect of the disclosure, the method further includes pressing the rigid inner ring portion onto the outer surface of the housing body.

In accordance with another aspect of the disclosure, the method further includes providing the rigid inner ring portion having a first lip spaced axially from a second lip by a cylindrical portion with the flexible, resilient outer ring portion being disposed about the cylindrical portion in captured relation between the first lip and the second lip.

In accordance with another aspect of the disclosure, a method of manufacturing a deflector ring for a constant velocity joint assembly is provided. The method includes providing a rigid inner ring portion and providing a flexible, resilient outer ring portion, wherein the rigid inner ring portion and the flexible, resilient outer ring portion are dissimilar materials. Further, fixing the flexible, resilient outer ring portion to the rigid inner ring portion.

In accordance with another aspect of the disclosure, the method further includes providing the flexible, resilient outer ring portion as a non-metal material and providing the rigid inner ring portion as a metal-based material.

In accordance with another aspect of the disclosure, the method further includes providing the flexible, resilient outer ring portion as a polymeric material and providing the rigid inner ring portion as a metal material.

In accordance with another aspect of the disclosure, the method of manufacturing a deflector ring further includes providing the rigid inner ring portion having a first lip spaced axially from a second lip by a cylindrical portion and capturing the flexible, resilient outer ring portion between the first lip and the second lip.

In accordance with another aspect of the disclosure, the method of manufacturing a deflector ring further includes capturing the flexible, resilient outer ring portion between the first lip and the second lip by folding one of the first lip or the second lip toward the other of the first lip or the second lip.

In accordance with another aspect of the disclosure, the method of manufacturing a deflector ring further includes stretching an inner periphery of the flexible, resilient outer ring portion to fit over one of the first lip or the second lip and allowing the inner periphery to relax for captured receipt between the first lip and the second lip.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is an end view of a deflector ring of the constant velocity joint assembly of FIG. 1 in accordance with an aspect of the disclosure;

FIG. 3 is a cross-sectional view of the deflector ring taken generally along line 3-3 of FIG. 2;

FIG. 3A is a view similar to FIG. 3 showing an outer ring portion of the deflector ring disposed against a first lip of an inner ring portion of the deflector ring prior to forming a second lip of the inner ring portion to capture the outer ring portion between the first and second lips of the inner ring portion;

DETAILED DESCRIPTION

Referring now to the Figures, where the invention will be described with reference to specific embodiments, without limiting same, it is to be understood that the disclosed embodiments are merely illustrative of the non-limiting embodiments of the invention that is embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
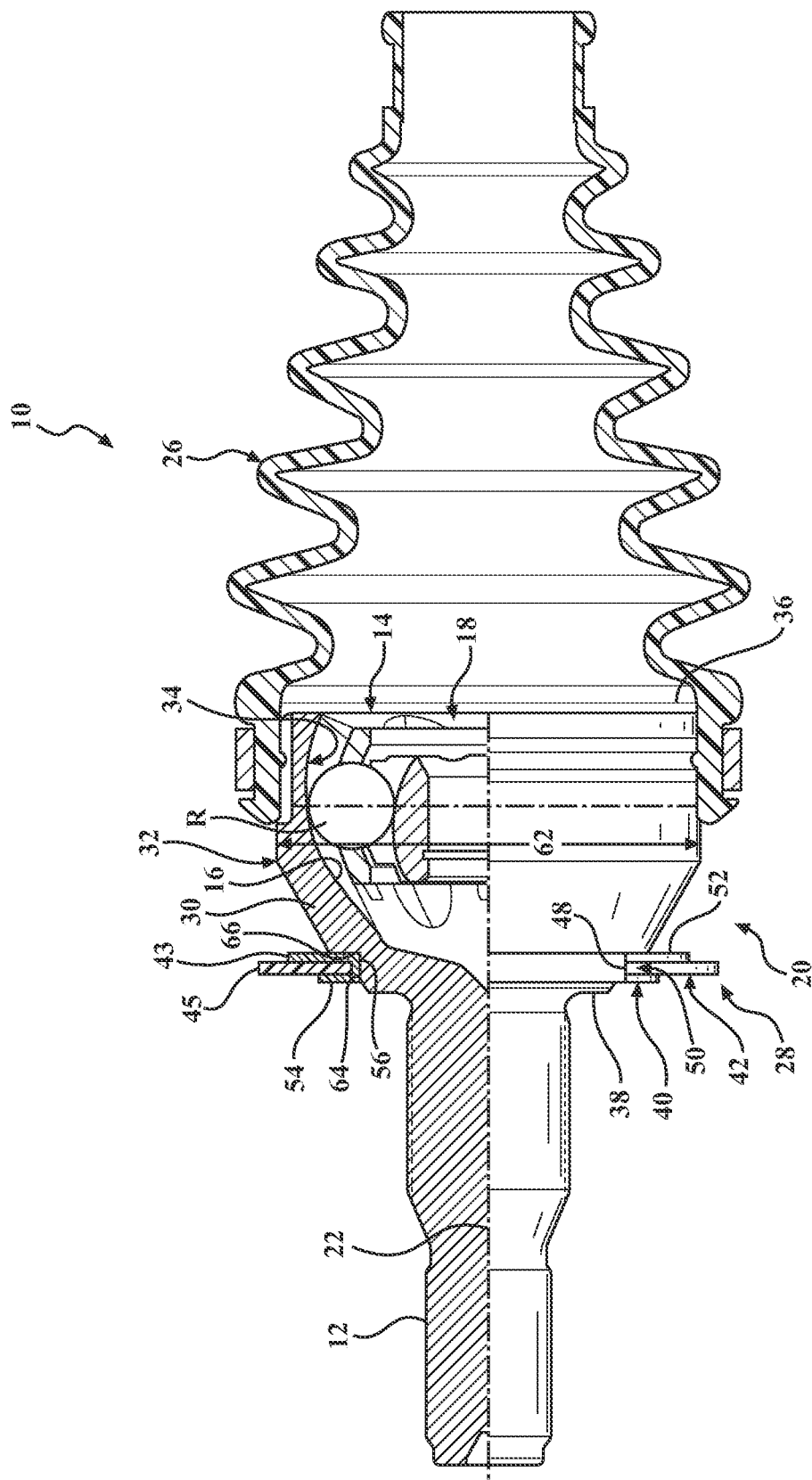
FIG. 1 is a cross-sectional view of a constant velocity joint assembly in accordance with an aspect of the disclosure.

Referring to FIG. 1, a constant velocity joint assembly, referred to hereafter as CV joint 10, constructed in accordance with one aspect of the disclosure is shown, wherein the CV joint 10 enables torque transfer between two rotatable shaft members with possible axial position or angular position changes relative to each other. The CV joint 10 is configured to transmit torque from a first shaft member 12 to a second shaft member (not shown) through a roller assembly 14, such that the first shaft member 12 is operatively connected to the second shaft member through various rotational speeds, joint angles, or telescopic positions, as is well known and understood by one possessing ordinary skill in the art of CV joint technology. It is to be recognized that the roller assembly 14 may include various types of rollers R, including cylindrical rollers, or otherwise, and that the ball type rollers R illustrated are by way of example and without limitation.

The CV joint 10 includes a CV joint housing, referred to hereafter as housing 20, which extends from the first shaft member 12 along a longitudinal axis, shown as a longitudinal central axis 22. The combination of the housing 20 and the first shaft member 12 are rotatable in fixed, conjoint relation with one another about the longitudinal central axis 22.

The housing 20 includes a housing body 30. The housing body 30 is shown as being generally cup-shaped having an outer surface 32 and an inner cavity, also referred to as bore 18, bounded by an inner surface 34, each extending along the longitudinal central axis 22 between a first housing end 36 and a second housing end 38. The inner surface 34 defines at least one raceway 16 for low friction movement of the roller assembly 14 therealong, with the roller assembly 14 including a plurality of rollers R. It is to be understood that the raceway 16 can be formed other than illustrated to facilitate plunging, telescopic movement between the first shaft member 12 and second shaft member, as is known by persons possessing ordinary skill in the CV joint art, with such CV joints having multiple, axially extending raceways commonly referred to as tripot joints, which are contemplated herein.

The first shaft member 12 is fixedly connected to the housing body 30 proximate the second housing end 38, and can be formed as a monolithic piece of material with the housing body 30, or as a separated piece of material that is subsequently fixed to the housing body 30, such as via a weld joint, by way of example and without limitation. A flexible boot 26 is operably fixed to the housing body 30 to the first housing end 36, wherein the boot 26 extends away from the housing body 30 and away from the first housing end 36 along and about the central axis 22.

A deflector ring 28 is fixed to the outer surface 32 of the housing body 30 to inhibit water and debris from impacting, degrading and damaging the boot 26. The deflector ring 28 is a multi-piece member of dissimilar materials, including a relatively rigid inner ring portion 40 suited for maintaining the deflector ring 28 in fixed relation with the outer surface 32 of the housing body 30 and a relatively flexible, resilient outer ring portion 42 suited for inhibiting water and debris from passing thereby. The inner ring portion 40 can be formed of a rigid, strong metal-based material, such as from a metal impregnated material or a pure metal material, while the outer ring portion 42 can be formed of a flexible, resilient non-metal material, such as from a polymeric material, by way of example and without limitation. With the outer ring portion 42 being relatively flexible, relative to the inner ring portion 40, an outer peripheral edge 43 of the outer ring portion 42 does not present a sharp, rigid and potentially damaging surface, and thus, during storage, shipping, handling, or otherwise, the deflector ring 28 does not cause damage, such as cutting, scraping or otherwise, to boots of adjacent CV joint assemblies. Further yet, with the outer ring portion 42 being resilient, the outer peripheral edge 43 does not become permanently bent (plastically deformed) or otherwise damaged during storage, shipment, handling, or the like, and thus, even if the outer peripheral edge 43 becomes flexed during handling or during storage, the flexed configuration is temporary, with the resiliency of the outer ring portion 42 causing the outer peripheral edge 43 to automatically return to its non-flexed configuration for fully functional use as intended.

The flexible, resilient outer ring portion 42, like the boot 26, can be made from a polymeric material, such as a natural rubber (NR) material, by way of example and without limitation. The flexible boot 26 can be made with polymeric material having a first durometer, such as between about 50-80 Shore, by way of example and without limitation, and the outer ring portion 42 from a material having a second durometer, wherein the first durometer and the second durometer can be within about 5 to 10 percent of one another, by way of example and without limitation. Of course, the boot 26 and the outer ring portion 42 can be made of the same type of material, and thus, the first durometer and the second durometer can be the same. Regardless, the polymeric material, whether made of NR or otherwise, has good strength and abrasive resistance, and great elasticity and resiliency under a relatively wide range of normal, anticipated operating temperature, as expected in the use of vehicle in a wide range of varying climates. NR has some degree of plasticity and excellent mechanical strength, while hysteresis loss of NR is small, and thus, a small amount of heat would be produced after many times of deformation, therefore its resiliency is great. The NR can also include an antioxidant, lending to the NR being able to be exposed to continuous periods of sun, while also withstanding extensive (years) of storage without degradation of material properties. NR also retains good elasticity even under the temperature of 40 C degree below zero. A further material choice for the boot 26 and/or outer ring portion 42 includes polychloroprene, including chloroprene rubber (CR), by way of example and without limitation. CR is oil proof, heat proof, fire resistant, antioxidant, acid-and-alkali proof and corrosion resistant. On the other hand, CR has great tensile strength, elongation, reversible crystallinity and cohesiveness. Ultimately, it is important that the resilient outer ring portion 42 be flexible to prevent damage to other component parts that may come into contact with the outer ring portion 42, such as during manufacture, handling, shipping and storage. Accordingly, it is contemplated herein that any suitable non-metal material can be used, as desired.

As shown best in FIG. 3, the rigid inner ring portion 40 of the deflector ring 28 has a maximum outermost first dimension 44, extending radially relative to the central axis 22, which can be an outer diameter of the outermost peripheral edge 43 of the inner ring portion 40 if the outermost peripheral edge 43 is circular. Otherwise, it is contemplated herein that the outermost peripheral edge 43 of the inner ring portion 40 may not be circular. The flexible, resilient outer ring portion 42 has a maximum outermost second dimension 46, extending radially relative to the central axis 22, which can be an outer diameter of an outermost peripheral edge 45 of the outer ring portion 42 if the outermost peripheral edge 45 is circular. Otherwise, it is contemplated herein that the outermost peripheral edge 45 of the outer ring portion 42 may not be circular. Regardless of the respective shapes of the outer peripheries, the second dimension 46 is greater than the first dimension 44. Accordingly, the outermost peripheral edge 45 of the outer ring portion 42 extends radially outwardly from the outer peripheral edge 43 of the inner ring portion 40.

The flexible, resilient outer ring portion 42 has an inner periphery 48 and the rigid inner ring portion 40 has a recessed channel 50. At least a portion of the inner periphery 48 is disposed and captured in the recessed channel 50. The recessed channel 50 can be provided being annular, thereby being circumferentially continuous, wherein the entirety of the inner periphery 48 of the flexible, resilient outer ring portion 42 can be disposed and captured in the circumferentially continuous recessed channel 50. Otherwise, it is contemplated that the recessed channel 50 could be circumferentially discontinuous, if desired.

The recessed channel 50 is bounded by a first lip 52 spaced axially from a second lip 54 along the central axis 22 by a cylindrical portion 56. The first lip 52 has an outermost first dimension 58 and the second lip 54 has an outermost second dimension 60. The first dimension 58 can be greater than the second dimension 60, such that the first lip 52 forms the outermost first dimension 44. As such, the second lip 54 can have a reduced dimension relative to the first lip 52, wherein the reduced second dimension 60 can facilitate assembly of the outer ring portion 42 within the recessed channel 50. The inner ring portion 40 can be formed of a constant thickness (t; FIG. 3A) piece of metal-based or metal material, such that the first lip 52, the cylindrical portion 56, and the second lip 54 can be provided having a constant thickness (t). Otherwise, it is contemplated herein that the lips 52, 54 and cylindrical portion 56 can have different thicknesses from one another, if desired.

The outer surface 32 of the housing body 30 has a maximum housing outermost dimension, which can be an outer diameter 62 if the outer surface 32 is cylindrical, while the maximum inner ring outermost dimension 44 can be, and is preferably less than the maximum housing outermost dimension 62, thereby avoiding contact of the inner ring portion 40 with adjacent components. Meanwhile, the maximum outer ring outermost dimension 46 can be, and is preferably greater than the maximum housing outermost dimension 62, thereby providing optimal shielding protection to the boot 26. As such, as discussed above, in storage, shipping and/or handling, with the maximum inner ring outermost dimension 44 being less than the maximum housing outermost dimension 62, the inner ring portion 40 is inhibited from contacting surrounding components, with the flexible, resilient outer ring portion 42 be able to contact the surrounding components without causing damage to the components or becoming damaged (permanently bent or otherwise deformed).

To facilitate assembly, the housing body 30 can be formed having a generally cylindrical portion 64 with a shoulder 66 extending radially outwardly from the generally cylindrical portion 64 in generally transverse relation therefrom. The deflector ring 28 can be fixed on the generally cylindrical portion 64 with the cylindrical portion 56 of the inner ring portion 40 having a tight fit, such as an interference press fit thereon, to prevent the deflector ring 28 from moving relative to the housing body 30 upon being pressed thereon. While pressing the deflector ring 28 onto the cylindrical portion 64, the first lip 52 of the inner ring portion 40 can be brought into abutting engagement with the housing shoulder 66, thereby acting to locate and fix the deflector ring 28 in the desired position.

Figure 3B:
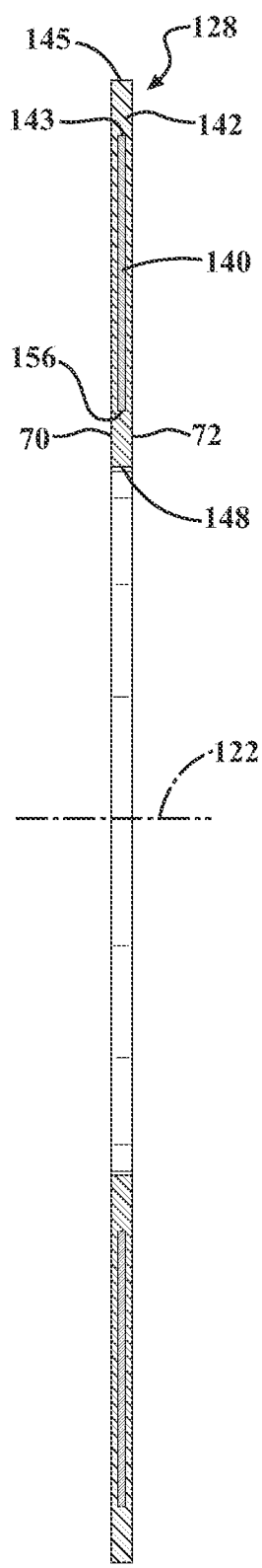
FIG. 3B is a view similar to FIG. 3 of a deflector ring of the constant velocity joint assembly of FIG. 1 in accordance with another aspect of the disclosure.

In FIG. 3B, a cross-section view similar taken along a similar line 3-3 of FIG. 2 of a deflector ring 128 constructed in accordance with another aspect of the disclosure is shown, wherein the same reference numerals, offset by a factor of 100, are used to identify like features. The deflector ring 128, like the deflector ring 28 discussed above, has a relatively rigid inner ring portion 140 suited for maintaining the deflector ring 128 in fixed relation with the outer surface 32 of the housing body 30 and a relatively flexible, resilient outer ring portion 142 suited for inhibiting water and debris from passing thereby. The relatively flexible, resilient outer ring portion 142 has an outer peripheral edge 145 of the flexible, resilient outer ring portion extending radially outwardly from an outer peripheral edge 143 of the rigid inner ring portion 140. A notable distinction over the deflector ring 28 discussed above is that the rigid inner ring portion 140 is overmolded with desired polymeric material, such as those polymeric materials discussed above. As a result of being overmolded, the entirety of the rigid inner ring portion 140 can be concealed and encapsulated by the resilient outer ring portion 142, thereby avoiding any possible contact of the rigid inner ring portion 140 with neighboring components. The deflector ring 128 is shown as being flat, with the material of the resilient outer ring portion 142 having flat opposite sides 70, 72 extending between an outer peripheral edge 145 and an inner periphery 148. The inner periphery 148 is shown as extending radially inwardly of an innermost portion 156 of the rigid inner ring portion 140 toward a central axis 122, by way of example and without limitation. It is contemplated herein that the inner periphery 148 could be in flush alignment with the innermost portion 156 of the rigid inner ring portion 140 or the innermost portion 156 of the rigid inner ring portion 140 could extend radially inwardly from the inner periphery 148, if desired. However, as with the deflector ring 28, the outer peripheral edge 145 must extend radially outwardly beyond an outer peripheral edge 143 of the rigid inner ring portion 140 to avoid having the rigid inner ring portion 140 contacting neighboring components.

Figure 3C:
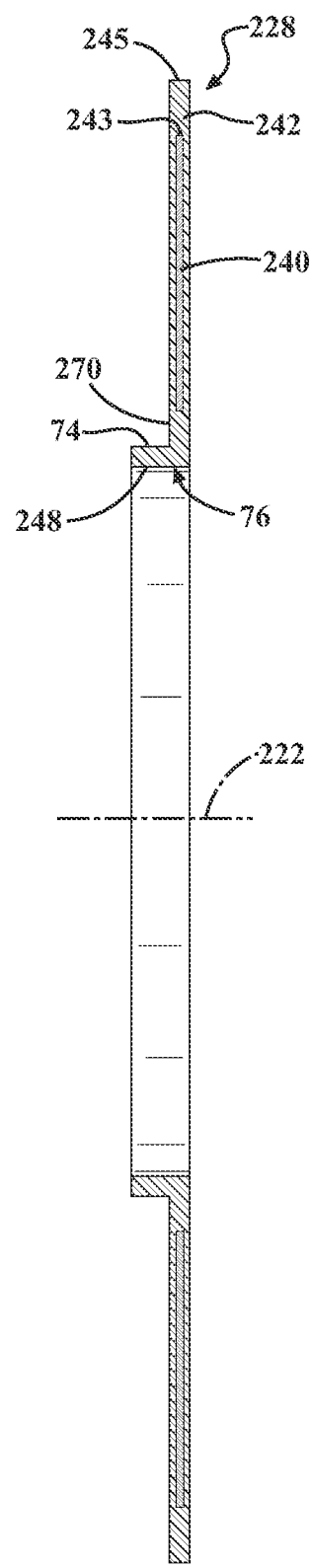
FIG. 3C is a view similar to FIG. 3 of a deflector ring of the constant velocity joint assembly of FIG. 1 in accordance with yet another aspect of the disclosure.

In FIG. 3C, a cross-section view similar taken along a similar line 3-3 of FIG. 2 of a deflector ring 228 constructed in accordance with another aspect of the disclosure is shown, wherein the same reference numerals, offset by a factor of 200, are used to identify like features. The deflector ring 228, like the deflector ring 128 discussed above, is over molded and has a relatively rigid inner ring portion 240 suited for maintaining the deflector ring 228 in fixed relation with the outer surface 32 of the housing body 30 and a relatively flexible, resilient outer ring portion 242 suited for inhibiting water and debris from passing thereby. The relatively flexible, resilient outer ring portion 242 has an outer peripheral edge 245 of the flexible, resilient outer ring portion extending radially outwardly from an outer peripheral edge 243 of the rigid inner ring portion 240. As with the deflector ring 128 discussed above, the entirety of the rigid inner ring portion 240 can be concealed and encapsulated by the resilient outer ring portion 242, thereby avoiding any possible contact of the rigid inner ring portion 240 with neighboring components, while further preventing water and debris from eroding the metal inner ring portion 240. The deflector ring 228 is similar to the deflector ring 128 discussed above, however, an inner periphery 248 of the resilient outer ring portion 242 is shown as being generally L-shaped, as viewed along a cross-section taken generally along a central axis 222, having an annular leg 74 of the material forming the inner periphery 248 extending generally parallel with the central axis 222 laterally outwardly from a radially extending flat side 270 of the resilient outer ring portion 242. Accordingly, a generally cylindrical inner surface 76 is formed by the inner periphery 248, thereby providing an increased surface area for fixation with the outer surface 32 of the housing body 30. Otherwise, the deflector ring 228 is the same as discussed above for the deflector ring 128, and thus, no further discussion is believed necessary.

Figure 3D:
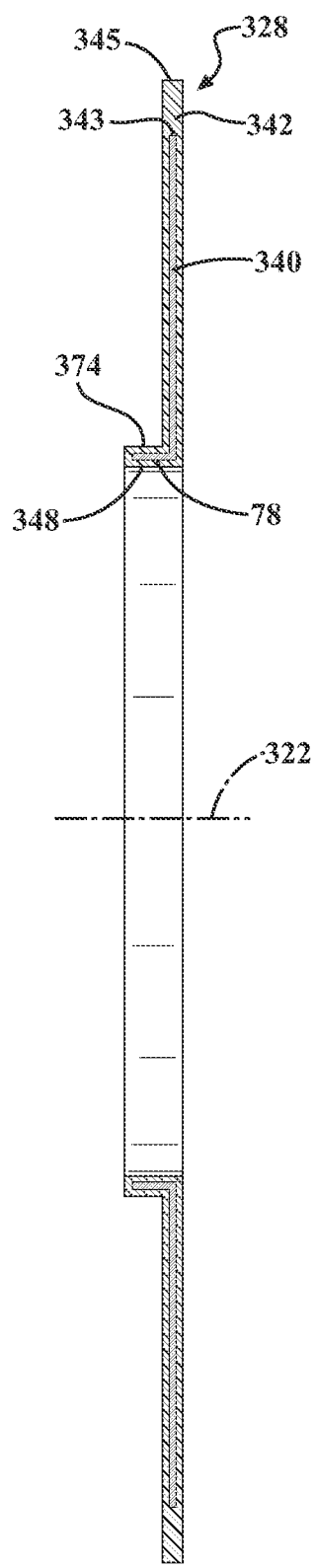
FIG. 3D is a view similar to FIG. 3 of a deflector ring of the constant velocity joint assembly of FIG. 1 in accordance with yet a further aspect of the disclosure.

In FIG. 3D, a cross-section view similar taken along a similar line 3-3 of FIG. 2 of a deflector ring 328 constructed in accordance with another aspect of the disclosure is shown, wherein the same reference numerals, offset by a factor of 300, are used to identify like features. The deflector ring 328, like the deflector rings 128, 228 discussed above, is over molded and has a relatively rigid inner ring portion 340 suited for maintaining the deflector ring 328 in fixed relation with the outer surface 32 of the housing body 30 and a relatively flexible, resilient outer ring portion 342 suited for inhibiting water and debris from passing thereby. The relatively flexible, resilient outer ring portion 342 has an outer peripheral edge 345 of the flexible, resilient outer ring portion extending radially outwardly from an outer peripheral edge 343 of the rigid inner ring portion 340. As with the deflector rings 128, 228 discussed above, the entirety of the rigid inner ring portion 340 can be concealed and encapsulated by the resilient outer ring portion 342, thereby avoiding any possible contact of the rigid inner ring portion 340 with neighboring components. The deflector ring 328 is shaped similarly to the deflector ring 228 discussed above, having a generally L-shaped inner periphery 348, as viewed along a cross-section taken generally along a central axis 322, of the resilient outer ring portion 342 formed by an annular leg 374 of the material forming the inner periphery 348. However, unlike the rigid inner ring portion 240 shown in FIG. 3C being generally flat, the rigid inner ring portion 340 has a generally L-shaped inner periphery, as viewed along the cross-section taken generally along the central axis 322, having an annular leg 78 of the metal material forming the inner ring portion 340 extending generally parallel with the central axis 322 encapsulated within the L-shaped inner periphery 348 of the resilient outer ring portion 342. Accordingly, an increased rigidity of the inner ring portion 340 is provided for fixation with the outer surface 32 of the housing body 30 by having the rigid metal material of the rigid inner ring portion 340 being configured to provide added support relative to the housing body 30. Otherwise, the deflector ring 328 is the same as discussed above for the deflector ring 228, and thus, no further discussion is believed necessary.

In accordance with another aspect of the disclosure, a method of manufacturing a CV joint housing 20 is provided. The method includes providing a housing body 30 having an outer surface 32 and an inner surface 34 extending between a first housing end 36 and a second housing end 38 along a central axis 22. Further, fixing a flexible boot 26 to the housing body 30. Further yet, fixing a deflector ring 28, 128, 228, 328 having a rigid inner ring portion 40, 140, 240, 340 and a flexible, resilient outer ring portion 42, 142, 242, 342 to the outer surface 32 of the housing body 30, wherein the rigid inner ring portion 40, 142, 242, 342 and the flexible, resilient outer ring portion 42, 142, 242, 342 are formed of dissimilar materials.

In accordance with another aspect of the disclosure, the method can further include pressing the rigid inner ring portion 40 onto the outer surface 32 of the housing body 30.

In accordance with another aspect of the disclosure, the method can further include providing the rigid inner ring portion 40 having a first lip 52 spaced axially from a second lip 54 by a cylindrical portion 56 with the flexible, resilient outer ring portion 42 being disposed about the cylindrical portion 56 in captured relation between the first lip 52 and the second lip 54.

In accordance with another aspect of the disclosure, the method can further include providing the rigid inner ring portion 140, 240, 340 being overmolded by material of the flexible, resilient outer ring portion 142, 242, 342.

In accordance with another aspect of the disclosure, the method can further include providing the rigid inner ring portion 140, 240, 340 being entirely encapsulated by material of the flexible, resilient outer ring portion 142, 242, 342.

In accordance with another aspect of the disclosure, a method of manufacturing a deflector ring 28, 128, 228, 328 for a CV joint assembly 10 is provided. The method includes: fixing a flexible, resilient outer ring portion 42, 142, 242, 342 to a rigid inner ring portion 40, 140, 240, 340 with an outer peripheral edge 45, 145, 245, 345 of the flexible, resilient outer ring portion 42, 142, 242, 342 extending radially outwardly from an outer peripheral edge 43, 143, 243, 343 of the rigid inner ring portion 40, 140, 240, 340.

In accordance with another aspect of the disclosure, the method further includes providing the flexible, resilient outer ring portion 42 as a non-metal material and providing the rigid inner ring portion 40 as a metal-based material.

In accordance with another aspect of the disclosure, the method further includes providing the flexible, resilient outer ring portion 42 as a polymeric material and providing the rigid inner ring portion 40 as a metal material.

In accordance with another aspect of the disclosure, the method can further include, providing the rigid inner ring portion 40 having a first lip 52 spaced axially from a second lip 54 by a cylindrical portion 56 and capturing the flexible, resilient outer ring portion 42 between the first lip 52 and the second lip 54.

In accordance with another aspect of the disclosure, the method can further include, capturing the flexible, resilient outer ring portion 42 between the first lip 52 and the second lip 54 by folding one of the first lip 52 or the second lip 54 toward the other of the first lip 52 or the second lip 54 along a folding direction of arrow A (FIG. 3A). It is to be recognized that the folding can be performed by way of any desired mechanism, such as rolling, pressing, or the otherwise.

In accordance with another aspect of the disclosure, the method can further include, stretching an inner periphery 48 of the flexible, resilient outer ring portion 42 to an expanded dimension to fit over one of the first lip 52 or the second lip 54 and allowing the inner periphery 48 to relax to a reduced dimension for captured receipt between the first lip 52 and the second lip 54, wherein the inner periphery 48 can be captured against removal from the recessed channel 50 and brought into an interference fit with the cylindrical portion 56 of the rigid inner ring portion 40, if desired.

In accordance with another aspect of the disclosure, the method can further include providing the second lip 54 having a reduced diameter relative to the first lip 52 to facilitate stretching the inner periphery 48 of the flexible, resilient outer ring portion 42 to an expanded dimension to fit over the second lip 54.

In accordance with another aspect of the disclosure, the method can further include fixing the flexible, resilient outer ring portion 142, 242, 342 to the rigid inner ring portion 140, 240, 340 by overmolding the rigid inner ring portion 140, 240, 340 with polymeric material to form the flexible, resilient outer ring portion 142, 242, 342.

In accordance with another aspect of the disclosure, the method can further include encapsulating the rigid inner ring portion 140, 240, 340 entirely with material of the flexible, resilient outer ring portion 142, 242, 342 during the overmolding process.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A deflector ring for a constant velocity joint, comprising:
   a rigid inner ring portion having a disc-shaped wall with opposite planar sides extending away from a central axis to an outer periphery, and
   a flexible, resilient outer ring portion fixed to at least one of the opposite planar sides of the rigid inner ring portion, said flexible, resilient outer ring portion extending radially outwardly from the outer periphery of the rigid inner portion, wherein the rigid inner ring portion and the flexible, resilient outer ring portion are dissimilar materials.

2. The deflector ring of claim 1, wherein the flexible, resilient outer ring portion is a non-metal material and the rigid inner ring portion is a metal-based material.

3. The deflector ring of claim 1, wherein the rigid inner ring portion is overmolded with material of the flexible, resilient outer ring portion.

4. The deflector ring of claim 1, wherein the flexible, resilient outer ring portion has an inner periphery and the rigid inner ring portion has a recessed channel bounded by a first lip spaced axially from a second lip along the central axis by a cylindrical portion, the first lip, the cylindrical portion, and the second lip having a constant thickness, at least a portion of the inner periphery being disposed in the recessed channel.

* * * * *